United States Patent [19]

Kaprelian

[11] 4,033,050
[45] July 5, 1977

[54] TEACHING MACHINE HAVING RESPONSE DEPENDENT PROGRAMMING

[76] Inventor: Charles Edward Kaprelian, Franklin St., Bechtelsville, Pa. 19505

[22] Filed: Apr. 1, 1975

[21] Appl. No.: 564,046

[52] U.S. Cl. .............................. 35/9 R; 35/48 R; 35/48 A

[51] Int. Cl.² ......................................... G09B 7/06

[58] Field of Search ................ 35/6, 8 R, 9 R, 9 A, 35/9 B, 9 C, 9 D, 9 E, 48 R, 48 A; 235/61.1 E; 283/66 A

[56] References Cited

UNITED STATES PATENTS

| | | | |
|---|---|---|---|
| 1,588,185 | 6/1926 | Groby | 283/66 |
| 2,788,590 | 4/1957 | Ormsby | 35/48 A |
| 2,859,541 | 11/1958 | Parmenter | 35/48 A |
| 3,100,352 | 8/1963 | Boisseuain | 35/48 R |
| 3,121,959 | 2/1964 | Uttal | 35/9 R |
| 3,264,760 | 8/1966 | St. Clair | 35/48 A |
| 3,266,049 | 8/1966 | Parmenter | 35/48 A |
| 3,538,622 | 11/1970 | Zadig | 35/9 A |
| 3,575,545 | 4/1971 | Millar | 35/9 C |
| 3,591,930 | 7/1971 | Little et al. | 35/9 A |
| 3,605,286 | 9/1971 | Plumly | 35/9 A |
| 3,626,608 | 12/1971 | Ingeneri | 35/48 R |
| 3,793,472 | 2/1974 | Sternberg et al. | 35/48 A |

Primary Examiner—Anton O. Oechsle
Assistant Examiner—Vance Y. Hum

[57] ABSTRACT

A teaching device is disclosed which includes a work sheet carrying a plurality of multiple choice question areas with a corresponding series of answers. The device comprises a case with a viewing window through which a question area on the work sheet is visible together with a choice of answers. The worksheet is coded and is interlocked with the sheet advance mechanism so as to permit advance to the next question only when the correct answer response has been made by the user. After the series of questions on the worksheet has been answered by pressing answer keys, the machine recycles the advance mechanism so that the worksheet repeats its cycle, stopping only at those questions which were originally answered erroneously, permitting review by the student and again requiring correct response. The worksheet receives markings indicating which questions were answered erroneously at first trial, thereby providing a basis for remedial training. The worksheets may either be preprinted or be prepared as a master in its entirety by the instructor, duplicating copies then being made on an ordinary office copier for classroom use.

9 Claims, 17 Drawing Figures

TEACHING MACHINE HAVING RESPONSE DEPENDENT PROGRAMMING

BACKGROUND OF THE INVENTION

Although numerous teaching machines using a multiple choice worksheet have been proposed and some are in use, such devices suffer from certain deficiencies. Most multiple choice worksheet devices do not, for example, require the student to make a correct answer after an erroneous answer has first been made, nor do they permit the instructor to determine that the student has made one or more specific erroneous attempts prior to arriving at the correct response.

These and other features, including the ability of the instructor to prepare the worksheets using commonly available facilities, have become increasingly desirable in an era when the growing needs for training are accompanied by inadequate availability of teaching personnel. The need for an easily operable teaching machine capable of adaptation to a wide variety of training and teaching applications continues to be widely expressed, as is the need for flexibility in worksheet arrangement to allow adaptation to a wide range of uses from that in undeveloped countries to vocational training and from first year teaching to preparation for higher grade examinations.

SUMMARY OF THE INVENTION

In accordance with the present invention there is provided an answer-responsive teaching apparatus using a work sheet which carries a series of questions or statements, one in each of a number of question areas within which are also shown a number of possible responses to the particular question. A number of keys on the apparatus permit the user to select a response to the question. The worksheet is so coded that if the proper key is depressed, denoting the correct answer, the worksheet is automatically advanced to display the next question or statement area. If an inappropriate key is depressed, denoting a wrong answer, the coding on the worksheet prevents advancement to the next question area and simultaneously marks the worksheet, as by means of a perforation, to indicate that the question has not been answered correctly. The user must then operate one or more alternative keys until the correct answer has been made, at which time the work sheet is automatically advanced to display the next question area.

After the last question has been answered, the first cycle of the program is complete and the worksheet is then advanced through a second cycle, stopping automatically only at those question areas which were answered erroneously in the first cycle. The user then operates the appropriate key to indicate that the correct answer has been learned and the worksheet is advanced to display the next question that was incorrectly answered during the first cycle. If the user fails to indicate the correct answer in the initial attempt during the second cycle, the worksheet is not advanced until the correct response has been made.

If during the second cycle any erroneous answers were made the machine enters a third cycle, following the program indicated for the second cycle. A fourth cycle is also available.

At the end of the last cycle the machine reverses its direction, ejects the worksheet and restores itself to its initial condition, at which time a new worksheet is inserted and the drum advances to display the first question area for reuse of the machine.

The worksheet includes, for each question area, a corresponding code area and a corresponding answer recording area. The nature of the worksheet is such that the original can be readily prepared by the instructor and duplicated on any copier such as of the Xerox of Electrofax type. The worksheets can also be obtained in completely prepared form covering a variety of subjects, ready for insertion into the machine.

In the preferred embodiment the worksheet is shown as having eight question areas on a sheet of standard 8½ × 11 inch paper. The answer coding is located in a space to the right of the question area and the answer recording is located in a space to the left of the answer area and is arranged to accommodate a total of 4 cycles or viewings, of the questions. A code-scrambling switch is also provided in the control circuitry of the machine to make its use cheat-proof.

It is an object of the present invention to provide a responsive answer learning device in which the programming is answer dependent.

It is a further object of the present invention to provide a responsive answer learning device means for preventing progression to a subsequent question until the earlier question has received a correct response.

It is still another object of the invention to provide a responsive answer learning device in which erroneous responses are recorded on the worksheet.

It is a further object of the invention to provide worksheet for a responsive answer learning device which carries the answer coding upon which depends the advancement from one question to the next.

In addition to those already mentioned, other objects, features and advantages of the present invention will be apparent from the detailed description of a preferred embodiment of the invention taken in conjunction with the accompanying drawings.

DESCRIPTION OF A PREFERRED EMBODIMENT

Figure 1:
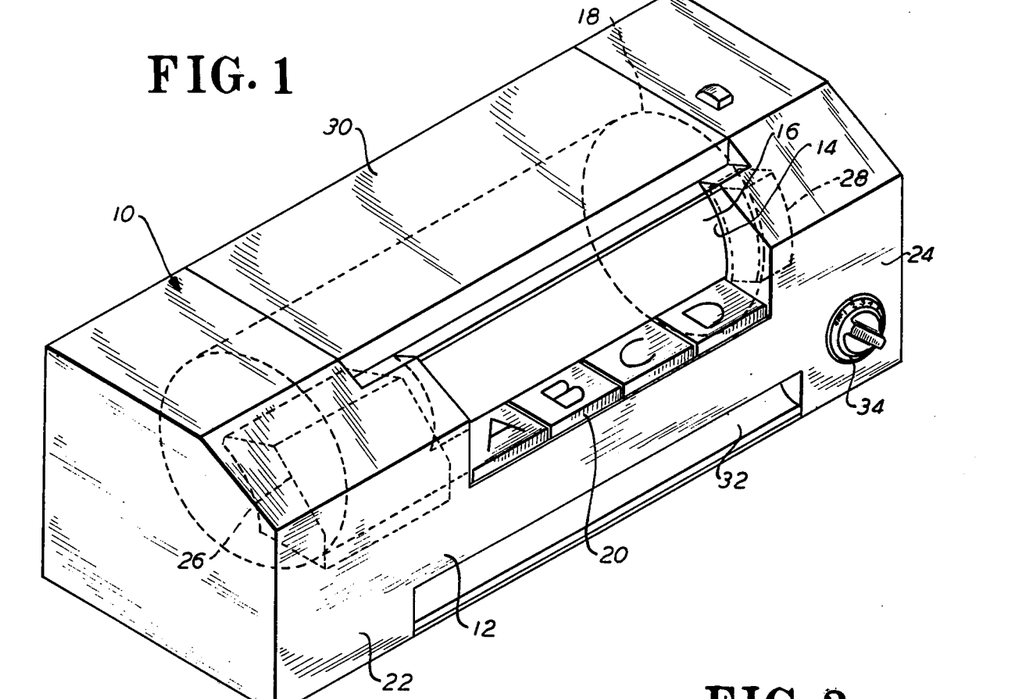
FIG. 1 is a perspective view of the device of the present invention.

Referring now more particularly to FIG. 1, there is illustrated in perspective the teaching device shown generally at 10 and comprising a body 12 which may be constructed of sheet metal, die castings, suitable plastic materials or a combination thereof. The front of the body includes an open portion 14 covered with a window of transparent plastic material through which can be seen a portion of the worksheet 16 which is wrapped around a drum 18 within the body. Adjacent to and immediately below opening 14 are four answer keys 20 marked A B C and D or similar designation corresponding to the answer notation on the work sheet.

The left side 22 of the device contains the main portion of the electronic controls, while the right side 24 contains the drive motor and the remaining portion of the electronic controls. An answer recording head 26 is slideably supported at the front of the body for incremental movement from left to right during the cycle shift. A code reading head 28 reads the coding on the worksheet and provides the information on the basis of which the worksheet is either held or advanced to the next area. Access to drum 18 is through hinged cover 30. The worksheet is discharged from opening 32 at the bottom, at the end of the cycle. An on-off and scrambler switch 34 of the rotary 4-pole multiple position type is provided at the right side.

Figure 2:
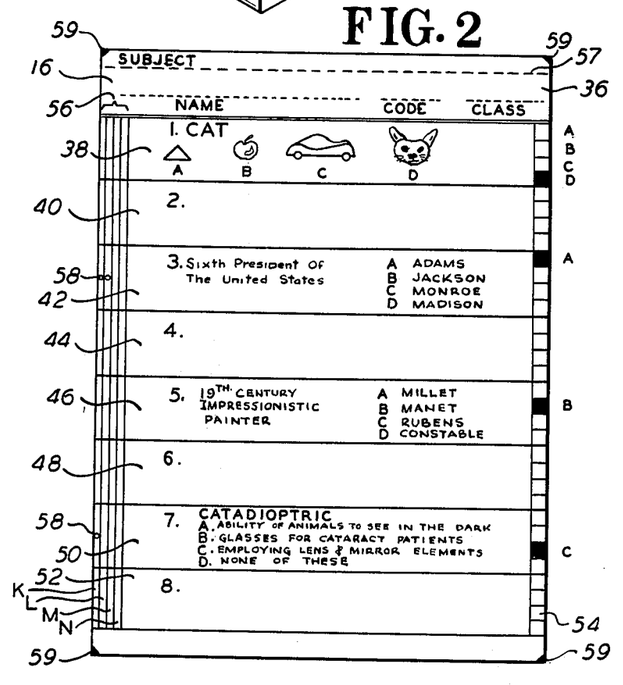
FIG. 2 is an example of the worksheet used with the device of the present invention.

Referring now to FIG. 2, the worksheet 16, preferably of a standard size such as 8 ½× 11 inches, is shown to have a heading section 36, eight statement and response (or question and answer) sections 38, 40, 42, 44, 46, 48, 50 and 52, respective code sections A, B, C and D for each of sections 38, 40, 42, 44, 46, 48, 50 and 52, in a coding column 54, and a response recording section 56 comprising columns K, L, M and N for each of statement and response sections 38, 40, 42, 44, 46, 48, 50 and 52. Sections 38, 42, 46 and 50 include examples of statements and response choices for a variety of subjects and are indicative of some of the ways for presentation of the material.

Figure 3:
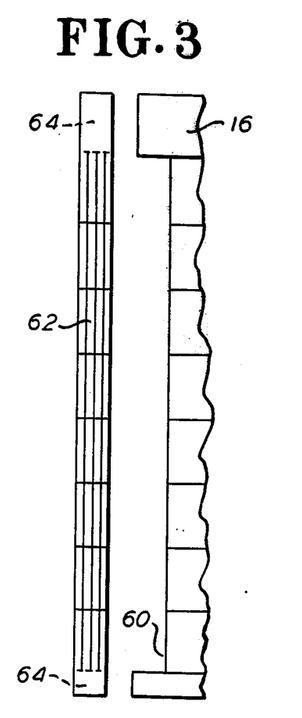
FIG. 3 is a modification of the worksheet shown in FIG. 2.

It will be seen that for each statement area only the code section corresponding to the correct response has been blackened to show that the response to the statements in sections 38, 42, 46 and 50 are D, A, B and C, respectively. This blackening is marked on the worksheet on the master from which duplicates are made in an office copy machine, or printed at the time of printing of commercially available worksheets. Inasmuch as it is necessary to insure good parallelism and alignment of the worksheet lines on the worksheet, telleale marks 59, preferably triangular in shape are provided at each corner. If one or more telltales are missing from a copy, it is an indication that misalignment might occur in use and the copy should be discarded. The purpose and utilization of column K, L, M and N as well as fold line 57 and the response record holes 58 will become apparent in the disclosure to follow. In FIG. 3 is shown a modification of the single use worksheet of FIG. 2 altered to permit reuse. It is obvious from the illustration and description of the worksheet of FIG. 2 and the mode of its use in the apparatus that the worksheet is altered through use only as the result of holes punched in the response recording columns K, L, M and N. It is therefore feasible to fabricate the main body of sheet 16 of a durable material such as cellulose acetate, polyester, plastic coated paper and the like, omitting the normal response recording area as at 60 and filling that area with a replaceable strip of opaque paper or the like 62. Strip 62 is preferably provided on the underside of its ends with pressure sensitive adhesive areas 64. After use, the strip 60 is removed, discarded, and replaced with a new strip.

Figure 4:
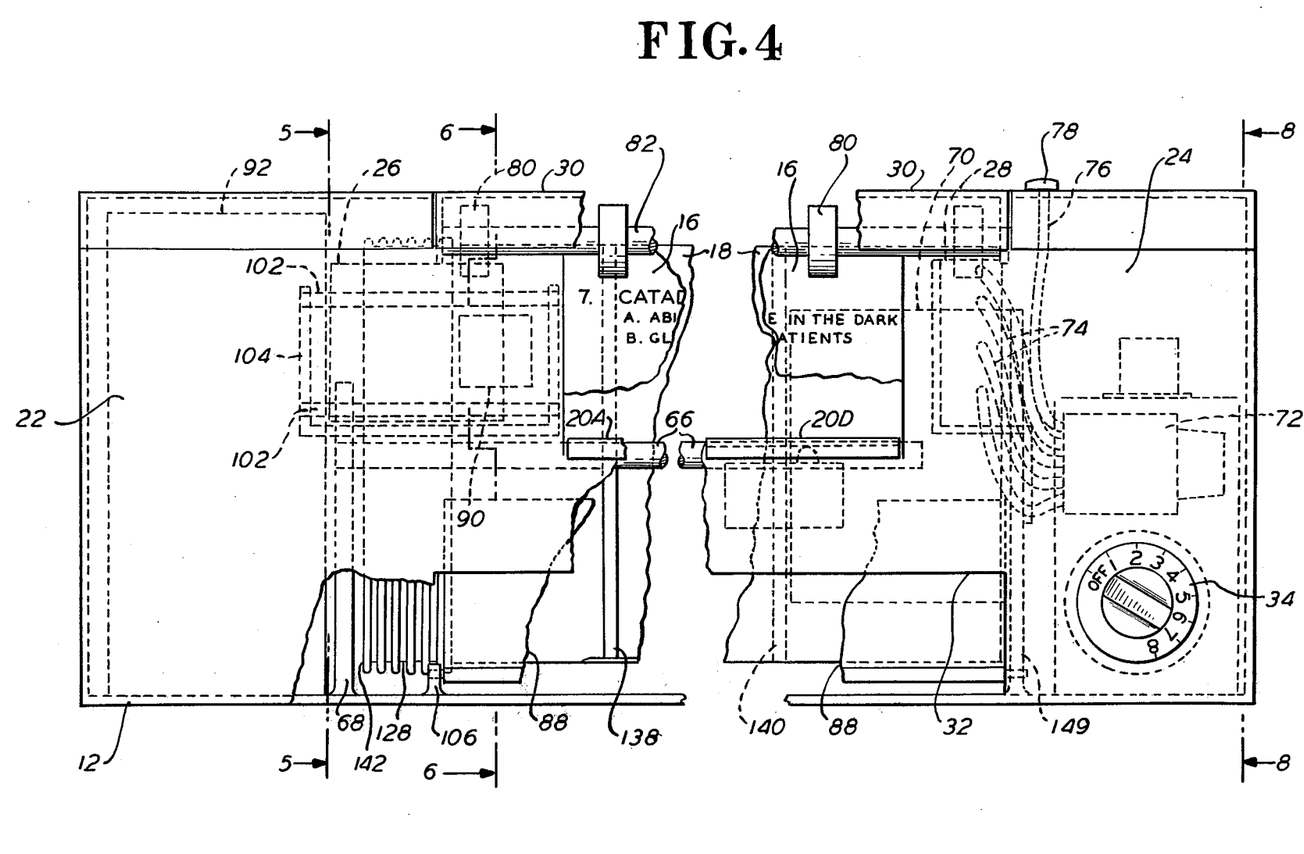
FIG. 4 is a front elevational view of the device with certain parts broken away.

Referring now to FIG. 4, it wil be seen that the central section of the device has been removed and that certain parts have been broken away to show the internal structure. Drum 18 is attached to a shaft 66 which is supported at one end on a standard 68 and at the other end by a driving motor 70. In the right side of the device near the motor is the light source 72 for illuminating the code reading cells in the code reading head 28. Light from a lamp in source 72 is led through four fiber optic tubes 74 to each of the four cells to be described. Light from the lamp is also conducted along tube 76 to an indicator 78 at the top of the case. Rollers 80, carried on a shaft 82 attached to cover 30, coacting with rollers 84 and 86 (shown in FIG. 5), hold the worksheet 16 against drum 18 when the cover is in closed position. Hinged near the front of the case is a curved paper guide blade or doctor blade 88, supported by standards 106 and 149, the function of which will be described in connection with FIG. 5. Within the drum 18 is a light source 90 for answer recording head 26. In the left side 22 of the body is the principal electronics package 92.

Figure 5:
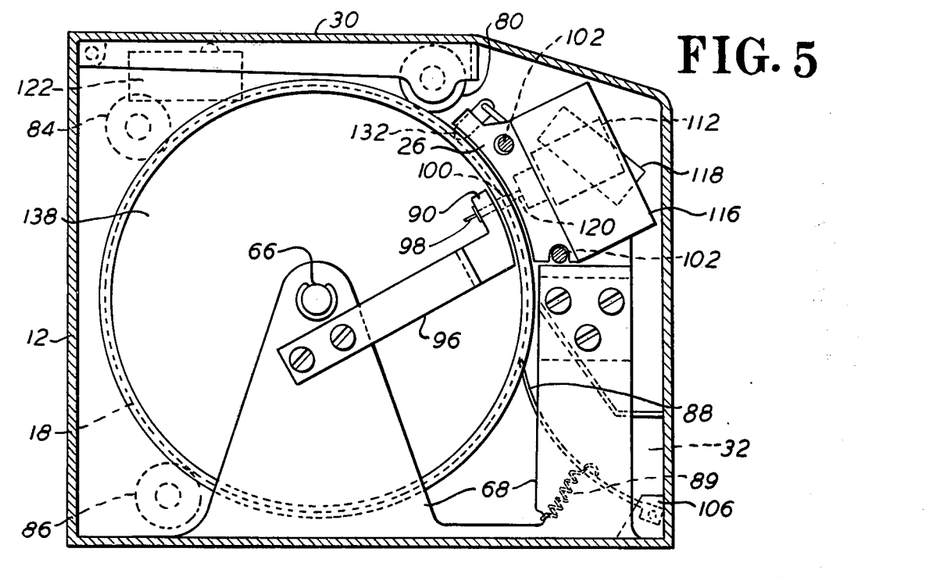
FIG. 5 is a cross sectional view of the device along line 5—5 of FIG. 4.
Figure 6:
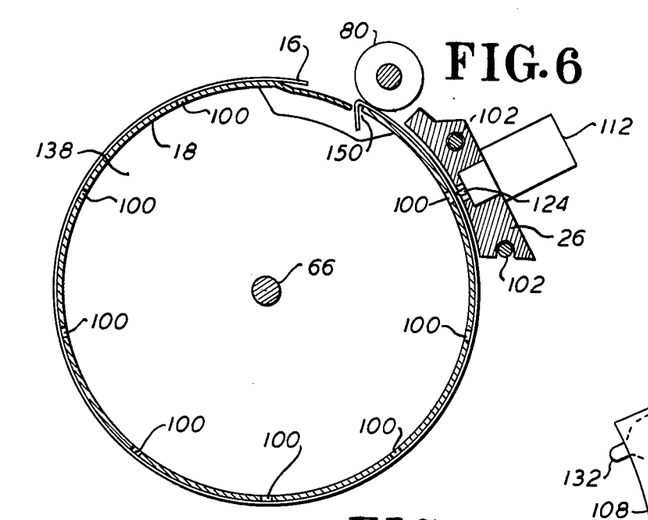
FIG. 6 is a partial cross sectional view of the device along line 6—6 of FIG. 4 with certain parts omitted.
Figures 9, 11:
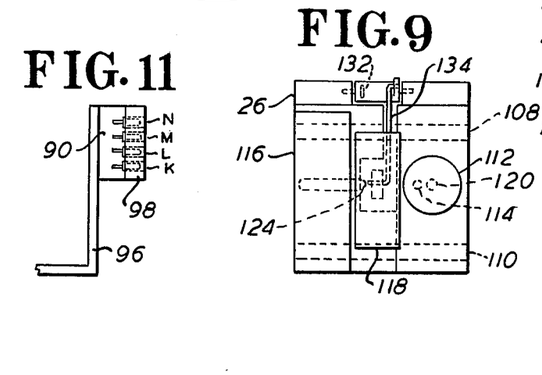
FIG. 9 is a front view of the response recording head.
FIG. 11 is a top view of the light source for the response recording head.
Figure 12:
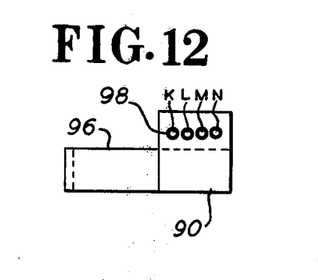
FIG. 12 is a front view of the light source for the response recording head.

FIGS. 5 & 6 which shown the device in vertical cross section along line 5—5 and 6—6 of FIG. 4, respectively, disclose the relationship between the drum 18, answer recording head 26, and its light source 90. Light source 90 is fastened to standard 68 by means of a bracket 96 and contains four light emitting diodes 98 spaced apart as shown in greater detail in FIGS. 11 and 12. Diodes 98, subdesignated K, L, M and N, are spaced apart a distance equal to that between the centers of response recording columns K, L, M and N of FIG. 2. Diodes 98 also are aligned with rows of holes 100 K, L, M and N in drum 18 to be described in connection with FIG. 7.

Figure 10:
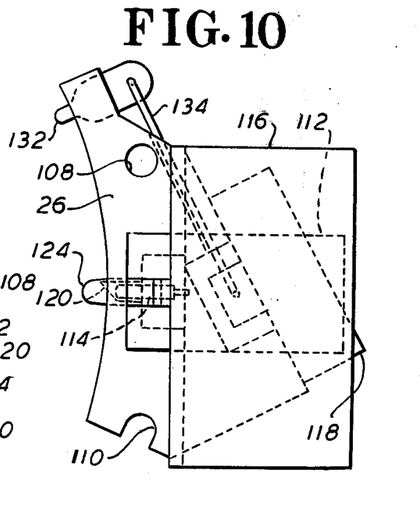
FIG. 10 is a side view of the response recording head on an enlarged scale.

Referring again to FIGS. 5 and 6, a switch 122 is shown to be urged to closed position by cover 30 when the latter is lowered. At the outside of the drum, slideably mounted on a pair of rods 102 supported by a bracket 104 and standard 68 is the answer recording head 26, shown in greater detail in FIGS. 9 and 10. Head 26, made of suitable plastic or metal is provided with a hole 108 and a slot 110 which are engaged by rods 102. Suitable cavities and surfaces in head 26 carry a punching solenoid 112, a solid state detector 114 which is preferably a photo transistor or photo diode, switches 116 and 118, and a guide finger 132. The plunger rod 120 of the solenoid is preferably beveled at its end to facilitate cutting through the worksheet and is aligned with the holes in the drum through which the punched out paper circle and the rod enter when the solenoid is actuated. The solenoid is oriented so that plunger rod 120 is normal to the surface of the drum.

Figure 7:
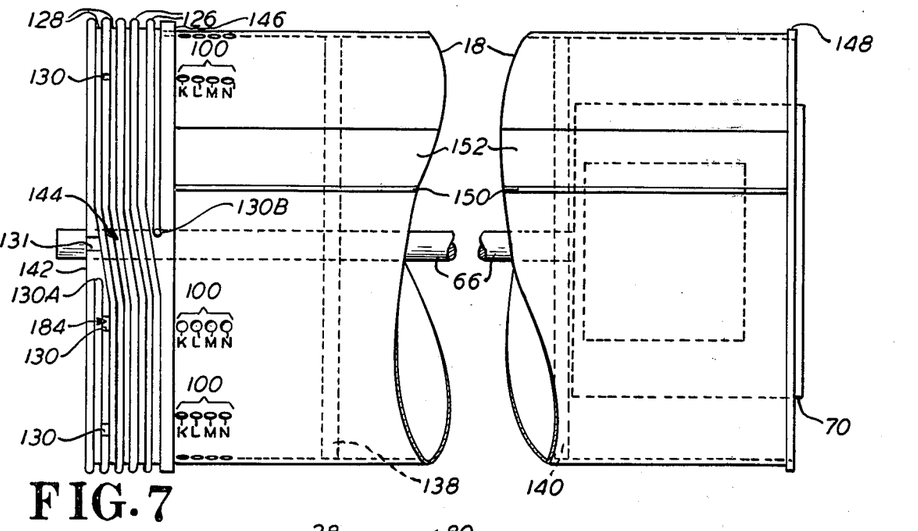
FIG. 7 is a partial view of the worksheet-carrying drum of the device.

Photo transistor 114 is oriented with its principal axis normal to the drum surface and is located in horizontal alignment with the solenoid and displaced to the left of the center line of the solenoid by a distance equal to that between the centers of each of the response recording columns K, L, M and N. Switch 116 carries an actuating tip 124 which coacts with the tops of the walls 126 between cam grooves 128 and, as shown in FIG. 7, with a series of switches 130 thereon. It also coacts with a notch 131. Switch 116 consists of two sets of contacts one set of which is normally closed when the tip is extended and another which is normally open when tip 124 is extended. Head 26 also carries near its upper end a finger 132 which is engaged within grooves 128 to drive head 126, and is positioned horizontally to the right of switch tip 124 a distance equal to one half that between the centers of response recording columns K, L, M and N. Finger 132 is mounted for swivelling about a horizontal axis and operates a single pole double throw switch 118 through a linkage 134.

Drum 18, shown in greater detail in FIG. 7, consists of an outer skin portion preferably of sheet metal attached to hub portions 138 and 140 which connect the drum to shaft 66. Drum 18 is provided with four rows of holes, 100, each spced apart by a distance equal to that between the centers of response recording columns K, L, M and N. The peripheral separation between the rows of holes is equal to the distance between the centers of the question areas 38 to 52. When worksheet 16 is in position on drum 18 the four rows of holes 100 K, L, M and N are located behind columns, K, L, M and N respectively of area 56 of the worksheet. When adapted for the 8 question worksheet shown in FIG. 2 eight rows of holes displaced from each other by 40 degrees are employed. The remaining 40 degress which completes the 360 degress around the drum is used for the heading section 36 and for the tail section.

At the left side of the drum is a cam member 142 preferably molded from a suitable material such as phenolic plastic, polypropylene or the like, and provided with a series of cam grooves 128 which allow no lateral displacement of answer recording head 26 during approximately 330 degress of rotation as indicated generally at 144. The spacing between the cam grooves, into which finger 132 of recording head 26 is engaged, is equal to the distance between the centers of response recording columns K, L, M and N. Hubs 138 and 140 and cam member 142 may be fastened to the drum skin in any convenient way, as by cementing. Flanges 146 and 148 are spaced apart slightly more than the width of the worksheet and serve to maintain the latter in correct lateral position on the drum. The right side of the drum, adjacent flange 148, is blackened (not shown) for a purpose to be described.

A slit 150 along the length of the drum receives the worksheet at its fold line for proper longitudinal positioning on the drum. As best shown in FIGS. 6 and 7, a depressed zone 152 along the length of the drum and adjacent the slit aids in allowing blade 88 to lift the tail portion of the worksheet for removal of the worksheet when the direction of drum rotation is reversed.

Figure 8:
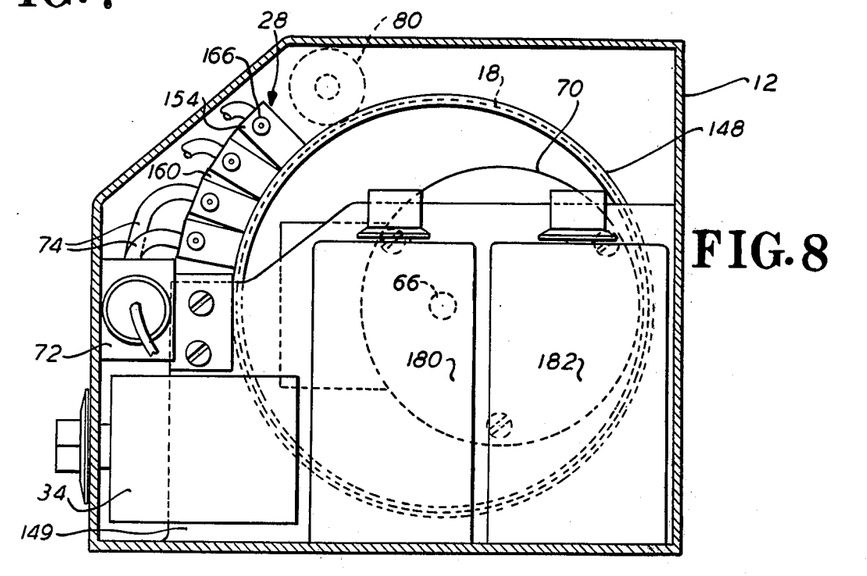
FIG. 8 is a cross sectional view of the device along line 8—8 of FIG. 4.
Figure 13:
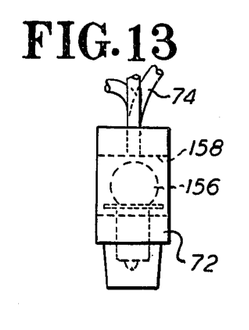
FIG. 13 is a top view of the code-reading light source.
Figure 14:
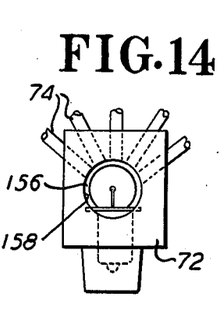
FIG. 14 is a front view of the code-reading light source.

As shown in FIG. 8 the right side of the device includes, in addition to drive motor 70 which in the preferred embodiment is of the clutch-controlled reversible type, the scrambling switch 34, code reader light source 72 comprising a small incandescent lamp, code reading head 28 and relays 180 and 182. The code reading head consists of four reading cells 154 arranged arcuately with respect to the drum so as to be in close proximity to the right edge of the worksheet and overlying coding column 54. Each cell receives light through a fiber optice tube 74 the opposite end of which is illuminated by a lamp 156, shown in greater detail in FIGS. 13 and 14, which depict the light source in top and front view respectively. An opening 158 through the body of the light source permits loss of heat through radiation and convection to thereby maintain the light source assembly in a relatively cool condition.

Figure 15:
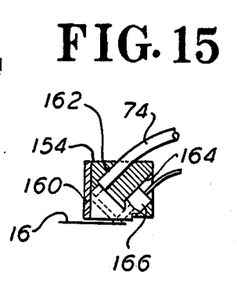
FIG. 15 is a side view of a code reading head in cross section.
Figure 16:
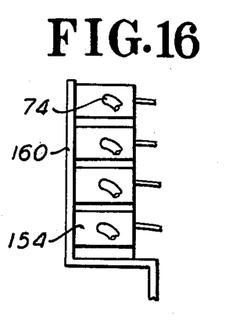
FIG. 16 is a front view of the code-reading head assembly.

The reading cells 154 are attached to a polished metal bracket 160 of aluminum or stainless steel which in turn is supported by a partition wall 149 which also supports motor 70. As shown in FIGS. 15 and 16, the body of each cell is provided with a hole 162 at 45° to the polished bracket into which a light tube 74 is fastened with its end terminating close to the polished surface. Displaced from hole 162 and parallel thereto is a second hole 164 which contains a photo transistor 166 or similar light responsive cell. Light from the fiber optics tube 74 is reflected first from the polished surface of bracket 106, then from the surface of coding column 54 of worksheet 16 and onto photo transistor 166. In place of the incandescent lamp and the four fiber optics tubes, four light emitting diodes may be employed in holes 162 in the general manner shown for the hole reader in FIG. 11 and 12.

Figure 17:
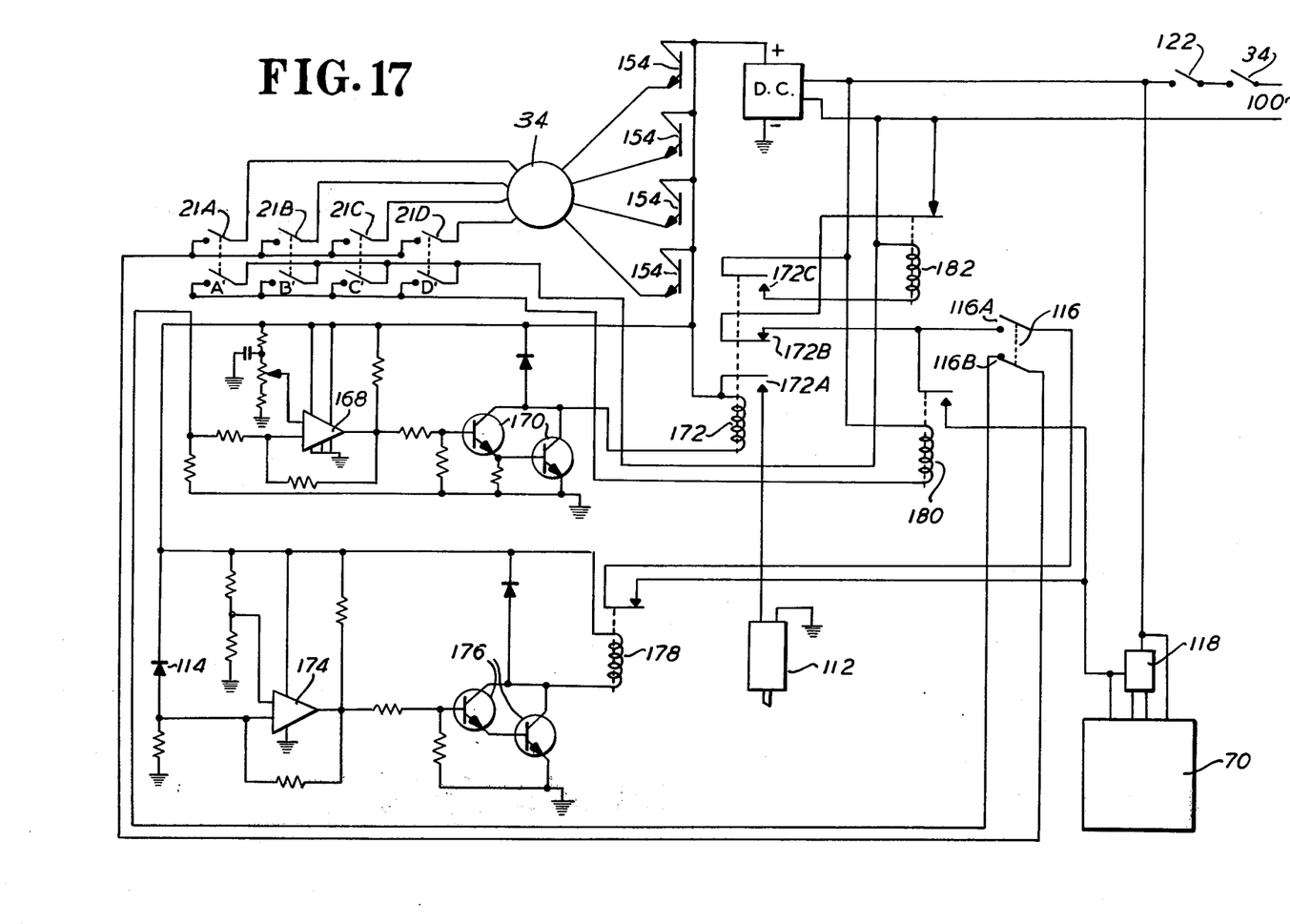
FIG. 17 is a circuit diagram of the device

The circuit diagram of the device is shown in FIG. 17. The output of code reading photo transistors 154 is fed through scrambler switch 34, which may be of the rotary 4 pole, 8 or 12 position type, to answer key switches 21 and thence to a voltage comparator 168 the output of which is amplified by a pair of transistors 170 and fed to relay 172 which has two normally open contacts 172A and 172C, and one normally closed contact 172B. The output of hole-detecting photodiode 114 is received by voltage comparator 174, amplified by transistors 176 and fed to a normally closed relay 178. Each time one of answer keys 20 is depressed one of switches 21A', B', C', or D' actuates time delay relay 180 which closes for a period of approximately 3 seconds.

Contact 172A of relay 172 actuates solenoid 112 while contact 172B opens the power circuit to motor 70. Contact 172C closes the circuit to time delay relay 182 which opens the circuit to the motor for a period of approximately five seconds. Switch 118 is the reversing switch for motor 70 and switch 116 detects and responds to notches 130 and 131 in the cam.

OPERATION

In use, the device is loaded by lifting door 30 which reveals slot 150 and inserting into the slot the tab which is formed when the worksheet is creased downwardly along fold line 57. Cover 30 is closed, therby closing switch 122, and scrambler switch 34 is turned to the predetermined setting whcih matches the code used by the instructor in filling coding column 54 and which is noted on the worksheet. In the present showing of FIG. 2 the answers are clear and unscrambled, corresponding to position 2 for switch 34. In most instances the instructor will utilize the scrambling feature to prevent cheating by the student. Thus, if the correct answer is in block B, the instructor will mark A, C, and D in the coding column, and the corresponding correct setting of switch 34 will effect the proper transposition.

When cover 30 is closed and switch 34 is turned to any of positions 1 through 8, motor 70 will rotate in a clockwise direction as viewed in FIG. 8, wrapping the worksheet around drum 18, the worksheet being held in close contact with the drum surface through the aid of rollers 80, 84, and 86, and paper guide blade 88. After drum 18 had rotated almost a full turn and question 1 is located in open portion 14 of the device, tip 124 of switch 116 will enter the first of 8 notches 130 on the raised dividing walls of cam 142, opening the holding circuit to the motor brake and stopping the drum.

In this stopped condition the drum is positioned as follows:

1. Statement and response section 36 is positioned in open area 14.

2. Tip 124 of switch 116 is in the first notch as indicated by arrow 184 in FIG. 7 and switch 116A is open. Switch 116B is simultaneously closed, completing the circuit from switches 21A, B, C and D to solenoid 172.

3. The tip of plunger 120 of solenoid 112 is aligned with the first hole of the first column of holes 100 in drum 18. This first hole and the three others in its row fall behind columns K, L, M and N, respectively, of statement and response section 56 in FIG. 2

4. Each of cells 154 of code reading head 28 is positioned over one of the coded areas A, B, C or D of coding column 54.

5. Each of the four light emitting diodes 98 is illuminating, from the rear, one of columns K, L, M and N in statement and response section 35 as shown in FIG. 2.

6. Finger 132 is in the second turn of cam 142 as indicated by the numeral 186 and the arrow in FIG. 7.

The student than presses one of Keys A B C D at the front of the device, thereby recording his response to the statement in area 36. The action closes one of double pole switches 21A –A', 21B –B', 21C –C'or 21D –D'. As a result, relay 180 will always close regardless of the response being correct or erroneous, and wills tay closed for about 3 seconds.

If the response is correct the blackened area which corresponds to the correct response in column 52 will not reflect sufficient light to the corresponding phototransistor 154 and the closing of relay 180 will allow the motor to begin rotating the drum until tip 124 is lifted out of the notch, closing switch thereby energizing the motor and moving statement and response area 38 of the worksheet until it has reached its proper position at the open area 14, at which time switch 116A will open the circuit to the motor brake when its tip 124 enters the next notch 130 and the worksheet will stop at the next question.

If the response is incorrect, the reflected light will result in a signal at one of photo transistors 154 and the circuitry will energize relay 172, closing switch 172 A. This will operate solenoid 112, and its tip 120 will puncture a hole in column K in statement area 36. Simultaneously, switch 172 B will open, momentarily preventing motor 70 from rotating the drum. Simultaneously, switch 172C will close, opening relay 182 for approximately 5 seconds, overcoming the action of relay 180, thus preventing motor 70 from moving the drum until the correct answer key is pressed, at which time the drum will advance the worksheet in the manner already described to the next statement area 38, thereby permitting the cycle to be repeated.

This action is repeated at each of the statement areas until the correct response is made to the last statement (area 52) when the drum will rotate through another 40 degrees during which time the answer recording head will be moved to the right (as seen in FIG. 4) by cam 128 a distance equal to the center-to-center distance of columns K, L, M and N, thus positioning the solenoid plunger over column L.

If at the end of this 40 degree rotation, phototransistor 114, which is now viewing column K, receives light through a hole in column K indicating an initially erroneous response to the statement in area 36, relay 178 will open, stopping the drum at that area. The user must once again make the correct response to the statement in that area before the drum and the worksheet can advance in the manner already described.

In the case of those statements areas where there is no hole indicating an initially erroneous response, the drum will continue to rotate, advancing with it worksheet. In the present example four cycles, represented by columns K, L, M and N, are provided for the strudent's efforts at self correction. Obviously, fewer or greater than this number can be programmed for the device.

When statement area 52 has been 8ncovered for the fourth time, tip 132 will abut against the end of the cam groove at 130B and actuate switch 118 to reverse motor and start drum 18 in the reverse direction. As the drum reverses direction, paper guide blade 88 will drop into depressed portion 152 of the drum as a result of urging by spring 89, lift the pwper from the drum and eject it from opening 32 at the lower front of the device. Drum 18 will continue to reverse until tip 132 abuts against the other end of the cam groove at 130A at which point switch 118 will be moved to the position to rotate the motor and drum in the forward direction. Simultaneously, tip 124 of switch 116 will drop into notch 131, stopping the motor and drum.

The cover is then lifted, a new worksheet is inserted and the cover lowered, closing switch 122. At this point any of keys 20 is pressed with the result that relay 80 closes, while relay 172 remains unenergized because detectors 154 do not receive sufficient reflected light from the blackened portion of the drum. This action energized relay 180, and motor 70 then advances drum 18 until tip 124 falls into the first of notches 130, thereby starting the entire cycle anew.

It is obvious that the recording of any holes in columns K, L, M and N will indicate the instructor where the student erred and the number of cycles necessary before the correct response was found, thus providing the basis for remedial instruction or other action.

It is also obvious that many modifications may be made including varying the number of statement areas, the number of trials permitted, the substitution of different light sources and light responsive cells, the use of opaque marks instead of holes to indicate error, and the use of different types of driving motors and other components without departing from the scope of the invention claimed.

What is claimed is:

1. A device for programmed instruction comprising, in combination, a rotatable, cylindrical shaped support means, holding means on said support means, an information sheet covering substantially all of the surface of said holding means and exposing for view one of a plurality of statement and response areas each containing a statement and two or more response choices one of which is a correct choice and one or more of which are incorrect choices, user-operated response entry members corresponding in number to the number of response choices, coded means on said information sheet comprising an opaque area within each statement and response area, positioned in one of several locations, within each of said statement and response areas to indicate the correct choice of response to the statement for each of said areas, means for producing a mark within said statement and response area when an incorrect response choice is made on a response entry member, means for advancing said support means and said information sheet so as to expose subsequent statement and response areas to view, and means for automatically releasing the information sheet from said holding means by reversing the direction of rotation of said support means upon completion of viewing of the statement and response areas.

2. A device for programmed instruction comprising, in combination, a rotatable, cylindrical shaped support means, holding means on said support means, an information sheet covering substantially all of the surface of said holding means and exposing for view one of a plurality of statement and response areas each containing a statement and two or more response choices one of which is a correct choice and one or more of which are incorrect choices, user-operated response entry members corresponding in number to the number of response choices, coded means on said information sheet comprising an opaque area within each statement and response area, positioned in one of several locations, within each of said statement and response areas to indicate the correct choice of response to the statement for each of said areas, means for producing a mark within said statement and response area when an incorrect response choice is made on a response entry member, means for advancing said support means and said information sheet so as to expose subsequent statement and response areas to view, means for advancing the support means and the information sheet through a first complete cycle of successive viewings of all statement and response areas as the correct response entry member has been actuated for each previous are, means for advancing the support means and the information sheet through at least one additional complete cycle of successive viewing of the statement and response areas when at least one of the statements of the previous cycle has been answered erroneously, said advancing means being controlled so as to stop the support means and the information sheet to thereby expose to view each statement and response area the response to which was initially erroneous during the previous cycle and to pass by those areas area to which the initial response was correct, and means to mark a previously viewed statement and response area in the event that an incorrect response entry member is actuated during a susequent cycle, said mark being separate from any previous mark indicating erroneous response during an earlier cycle.

3. A device for programmed instruction as claimed in claim 2, said advance means being actuated to advance the support means and the information sheet when a correct response entry member is actuated during a subsequent cycle.

4. A device for programmed instruction as claimed in claim 3 including means for reversing the direction of the support means at the end of a cycle to restore the support means to its starting position.

5. A worksheet for a programmed instruction device having holding means for securing the worksheet thereto wherein the user can select one of two or more responses to a statement comprising a flexible sheet of non-opaque light reflecting material having thereon a plurality of areas each containing a statement and two or more proposed responses thereto, each of said areas including a first sub-area on which is marked the coded correct response in the form of an opaque mark and a second sub-area on which only erroneous responses are automatically recorded, the coded response marks of said first sub-area consisting of an array of rectangular areas, said areas having lower optical reflectivity than the unmarked surface of the worksheet.

6. A worksheet for a programmed instruction device having holding means for securing the worksheet thereto wherein the user can select one of two or more responses to a statement comprising a flexible sheet of non-opaque light reflecting material having thereon a plurality of areas each containing a statement and two or more proposed responses thereto, each of said areas including a first sub-area on which is marked the coded correct response in the form of an opaque mark and a second sub-area on which only erroneous responses are automatically recorded, said second sub-area comprising a plurality of parallel columns.

7. A worksheet for a programmed instruction device having holding means for securing the worksheet thereto wherein the user can select one of two or more responses to a statement comprising a flexible sheet of non-opaque light reflecting material having thereon a plurality of areas each containing a statement and two or more proposed responses thereto, each of said areas including a first sub-area on which is marked the coded correct response in the form of an opaque mark and a second sub-area on which only erroneous responses are automatically recorded, said second sub-area comprising a replaceable strip of flexible material removably attached to said flexible sheet.

8. A worksheet for a programmed instruction device having holding means for securing the worksheet thereto wherein the user can select one of two or more responses to a statement comprising a flexible sheet of non-opaque light reflecting material having thereon a plurality of areas each containing a statement and two or more proposed responses thereto, each of said areas including a first sub-area on which is marked the coded correct response in the form of an opaque mark and a second sub-area on which only erroneous responses are automatically recorded, said second sub-area being adapted to record erroneous responses by perforation therethrough.

9. A device for programmed instruction comprising, in combination, a rotatable, cylindrical shaped support means, holding means on said support means, an information sheet covering substantially all of the surface of said holding means and exposing for view one of a plurality of statement and response areas each containing a statement and two or more response choices one of which is a correct choice and one or more of which are incorrect choices, user-operated response entry members corresponding in number to the number of response choices, coded means on said information sheet comprising an opaque area within each statement and response area, positioned in one of several locations, within each of said statement and response areas to indicate the correct choice of response to the statement for each of said areas, means for producing a mark within said statement and response area when an incorrect response choice is made on a response entry member, means for advancing said support means and said information sheet so as to expose subsequent statement and response areas to view, means for advancing the support means and the information sheet through a first complete cycle of successive viewings of all statement and response areas as the correct response entry member has been actuated for each previous area, and means for advancing the support means and the information sheet through at least one additional complete cycle of successive-viewing of the statement and response areas when at least one statement of the previous cycle has been erroneously answered.

* * * * *